: US 7,612,687 B2
: Nov. 3, 2009

(12) United States Patent
Nakamura

(54) ON-BOARD UNIT

(75) Inventor: Satoshi Nakamura, Kariya (JP)

(73) Assignee: DENSO CORPORATION, Kariya (JP)

(*) Notice: Subject to any disclaimer, the term of this patent is extended or adjusted under 35 U.S.C. 154(b) by 328 days.

(21) Appl. No.: 11/715,428

(22) Filed: Mar. 8, 2007

(65) Prior Publication Data

US 2007/0243813 A1  Oct. 18, 2007

(30) Foreign Application Priority Data

Mar. 27, 2006 (JP) .............................. 2006-085212

(51) Int. Cl.
G08G 1/09 (2006.01)
(52) U.S. Cl. .................. 340/905; 340/995.12
(58) Field of Classification Search ........... 340/627, 340/426.19, 988, 539.11, 573.1, 905, 995.12; 342/357.06, 357.12; 310/338, 366; 701/213
See application file for complete search history.

(56) References Cited

U.S. PATENT DOCUMENTS

| 4,533,966 | A | * | 8/1985 | Kume | 360/96.51 |
| 5,699,056 | A | * | 12/1997 | Yoshida | 340/905 |
| 5,822,192 | A | | 10/1998 | Hayashi | |
| 6,249,744 | B1 | * | 6/2001 | Morita | 701/213 |
| 6,603,405 | B2 | * | 8/2003 | Smith | 340/905 |
| 6,992,580 | B2 | * | 1/2006 | Kotzin et al. | 340/539.11 |
| 7,191,097 | B1 | * | 3/2007 | Lee et al. | 702/183 |
| 2003/0085325 | A1 | * | 5/2003 | Sugimoto et al. | 248/27.1 |
| 2005/0138652 | A1 | * | 6/2005 | Liao et al. | 720/647 |
| 2006/0229810 | A1 | * | 10/2006 | Cross et al. | 701/213 |

FOREIGN PATENT DOCUMENTS

| EP | 1-479-603 | 11/2004 |
| JP | A-2-15450 | 1/1990 |
| JP | A-5-325534 | 12/1993 |
| JP | A-6-333100 | 12/1994 |
| JP | A-2001-20320 | 1/2001 |
| JP | A-2003-302620 | 10/2003 |
| JP | A-2005-203592 | 7/2005 |

OTHER PUBLICATIONS

Office Action dated Oct. 10, 2008 in corresponding Chinese patent application No. 2007100889788 (and English translation).

* cited by examiner

Primary Examiner—Daniel Wu
Assistant Examiner—Charles G Curtis, III
(74) Attorney, Agent, or Firm—Posz Law Group, PLC

(57) ABSTRACT

An on-board unit includes a dust sensor for detecting an amount of dust in an air in a vehicle. When the amount of dust is equal to or greater than a predetermined value and a front panel of the unit is open, the front panel is moved to close a media slot and insertion/ejection operation of a medium is prohibited as a preventive measure for dust intrusion.

6 Claims, 6 Drawing Sheets

PANEL CLOSED

PANEL OPEN-1ST STEP

PANEL OPEN-2ND STEP

PANEL OPEN-3RD STEP

ON-BOARD UNIT

CROSS REFERENCE TO RELATED APPLICATION

This application is based on and claims the benefit of priority of Japanese Patent Application No. 2006-85212 filed on Mar. 27, 2006, the disclosure of which is incorporated herein by reference.

FIELD OF THE INVENTION

The present invention relates to an on-board unit with an opening into which a storage medium is inserted.

BACKGROUND INFORMATION

In a conventional on-board unit, if dust enters the unit through an opening provided in the unit, a mechanical or optical component inside the unit might go out of order, causing the unit to malfunction.

In order to address this problem, in an IC card terminal with a card insertion slot for insertion of an IC card, the card insertion slot is lined with a card insertion slot cover so as to prevent dust from entering the IC card terminal through the card insertion slot (for example, see Japanese Patent Document No. JP-A-H06-333100). In addition to this type of unit, various dust prevention techniques have been proposed (for example, see Japanese Patent Documents No. JP-A-2001-020320, JP-A-2003-302620, JP-A-2005-203592, and U.S. Pat. No. 5,822,192, and European Patent Document No. EP 1479603A2).

Some types of audio visual navigation systems have a deck slot 17a into which a medium such as a CD, DVD or MD is inserted as shown in FIG. 7. Other types of audio visual navigation systems have a deck slot 17a into which a medium such as a CD, DVD or MD is inserted, and a tilt panel 19 on the front of the unit, as shown in FIG. 8 and are structured so that as the tilt panel 19 is moved, a deck slot 18a for insertion of a medium storing map data appears as shown in FIG. 9.

These systems have the problem that if there is dust including a cloud of sand inside the vehicle compartment, dust enters the unit through the deck slot 17a as a medium is loaded or unloaded.

Also, in the unit with the tilt panel 19 as shown in FIG. 8, if the vehicle is running, with the tilt panel open as shown in FIG. 9, in an area where there is much dust including a cloud of sand, dust might enter the unit through the deck slot 18a behind the tilt panel 19 or a gap such as an opening through which a tilt bar 20a for moving the tilt panel 19 is passed.

If dust enters the unit in this way, it might cause rotation trouble of the motor inside the unit or operation trouble of the tilt mechanism for moving the tilt panel. In addition, dust might adhere to the optical lens of the laser pickup inside the unit, resulting in deterioration of the laser scanning performance, detection errors or similar problems.

It is difficult to apply the dust prevention measures as described in JP-A-H06-333100 to the above audio visual navigation systems because the card insertion slot cover might cause such a problem as deterioration of the laser scanning performance. Similarly, it is difficult to apply the techniques indicated in Japanese Patent Documents No. JP-A-2001-020320, JP-A-2003-302620, JP-A-2005-203592, and U.S. Pat. No. 5,822,192, and European Patent Document No. EP 1479603A2 to on-board audio units or audio visual navigation systems as described above.

SUMMARY OF THE INVENTION

The present invention has been made in view of the above problem and has an object to reduce intrusion of dust into an on-board unit on a vehicle.

The on-board unit of the present invention includes a dust sensor for detecting an amount of dust in the air in the vehicle, and a dust protector for preventing dust intrusion into the on-board unit. When a predetermined amount or more than a predetermined amount of dust is detected by the dust detector, the dust protector protects the on-board unit from intrusion of dust through an opening of a media slot.

Further, a current position of the vehicle and map data are employed for determining whether the vehicle is in a dusty area. When the vehicle is determined to be in the dusty area, the dust protector is controlled for protecting the on-board unit from dust intrusion.

Furthermore, when a dusty air at or around a certain spot is detected by the dust sensor, the detected spot is registered in a memory. In this manner, the dust protector is controlled for protecting the on-board unit from dust intrusion when the vehicle is determined to be at or around the detected spot.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
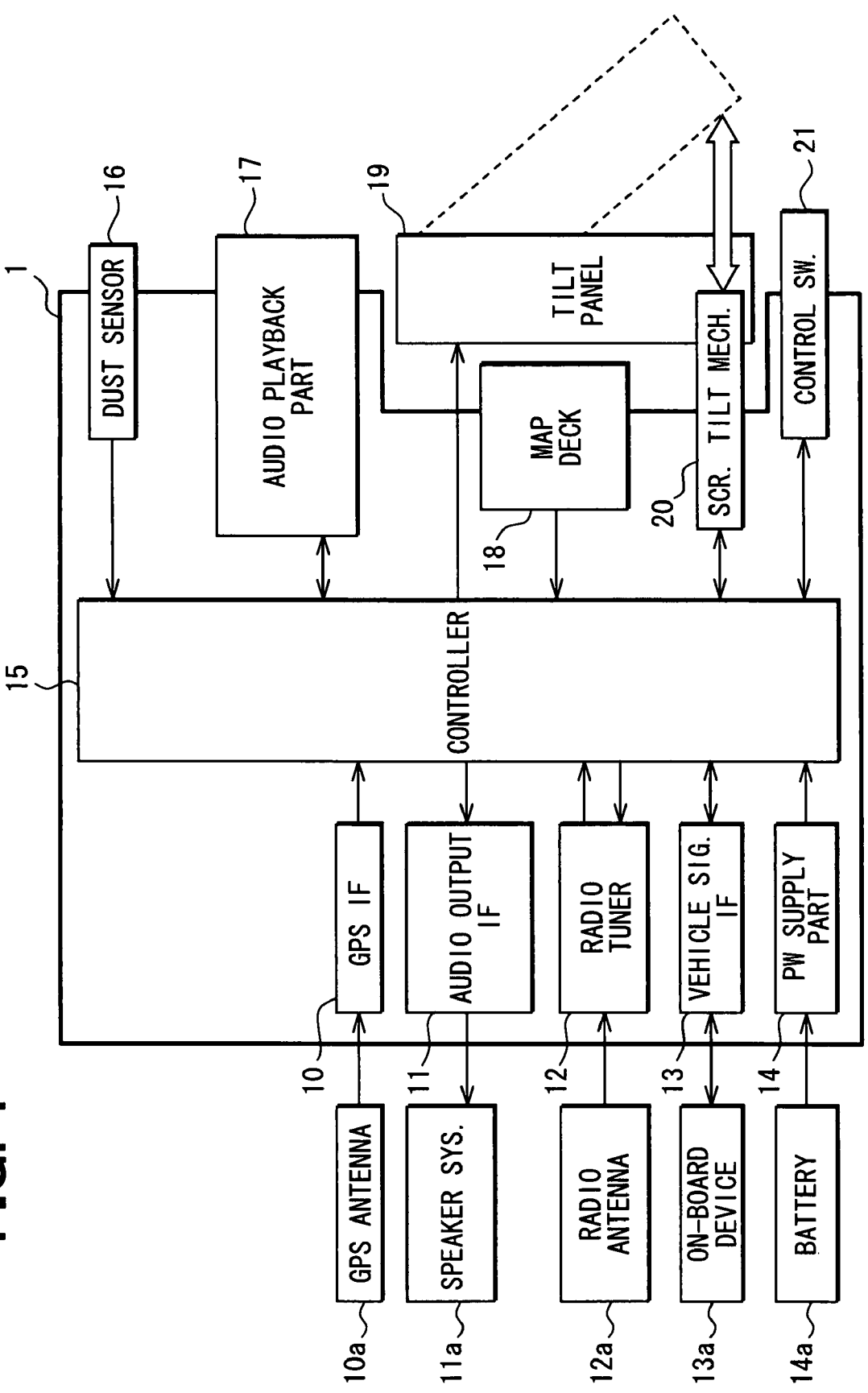
FIG. 1 shows a block diagram of an on-board unit in an embodiment of the present disclosure.

FIG. 1 shows a block diagram of an on-board unit according to one embodiment of the present invention. The on-board unit according to this embodiment consists of an audio visual navigation system unit (hereinafter referred to as the navigation system unit).

The navigation system unit 1 includes a GPS interface (the word "interface" is abbreviated as IF in the figure) 10, an audio output interface 11, a radio tuner 12, a vehicle signal interface 13, a power supply part 14, a controller 15, a dust sensor 16, an audio playback part 17, a map deck 18, a tilt panel 19, a screen tilt mechanism 20, and a control switch 21.

The GPS interface 10 is connected with a GPS antenna 10a which receives a positioning signal from a GPS satellite. The GPS interface 10 outputs a signal received by the GPS antenna 10a to the controller 15.

The audio output interface 11 is connected with an on-board speaker system 11*a*. The audio output interface 11 outputs an audio signal received from the controller 15 to the on-board speaker system 11*a*.

The radio tuner 12 is connected with a radio antenna 12*a* which receives a radio wave from an FM or AM radio broadcast station. The radio tuner 12 processes a signal received from the radio antenna 12*a* by amplification or demodulation and outputs it to the controller 15.

The vehicle signal interface 13 outputs a vehicle signal (for example, a vehicle speed pulse signal from a vehicle speed sensor) received from an on-board electronic device 13*a* installed in the vehicle to the controller 15.

The power supply part 14 converts the line voltage supplied from a power supply unit (car battery) 14*a* (for example, 13.5 V DC) into a given voltage (for example, 5 V) and supplies the given voltage to the components 10 to 13 and 15 to 21.

The controller 15 consists of a computer including a CPU, a memory and an I/O. The CPU carries out various processes in accordance with a program stored in a ROM.

Figure 2:
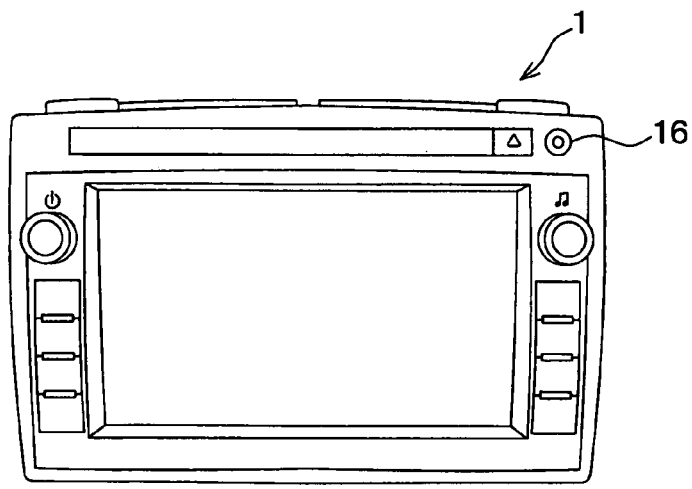
FIG. 2 shows a front view of the on-board unit in the embodiment of the present disclosure.

The dust sensor 16, intended to measure dust in the gas, is mounted on the front of the unit as shown in FIG. 2.

Figure 3A:
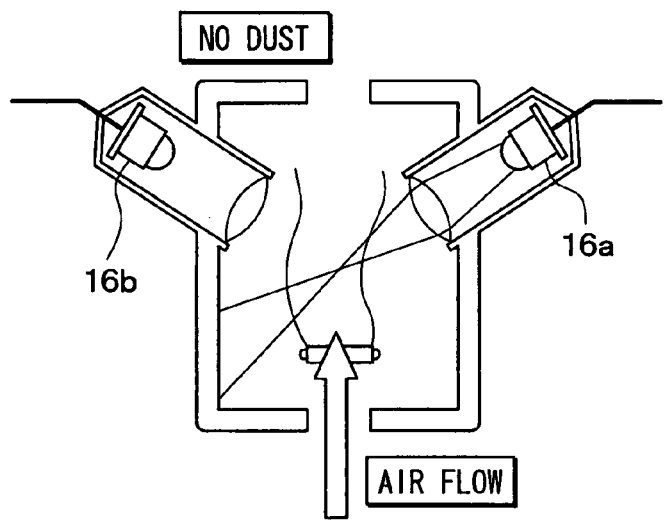
FIGS. 3A and 3B show illustrations of operation of a dust sensor.
Figure 3B:
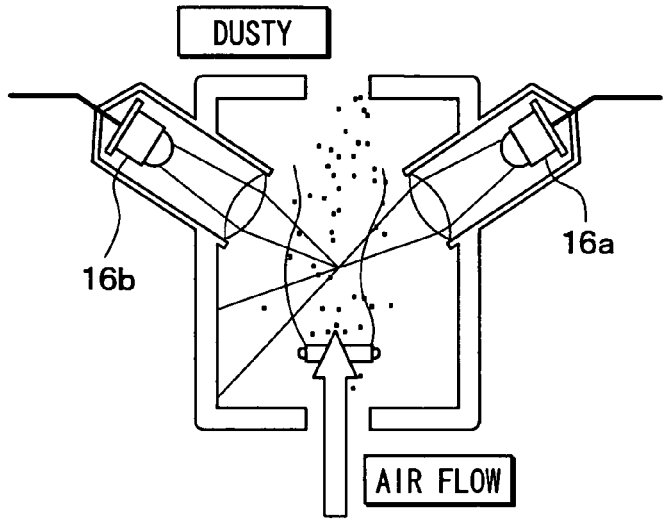

The dust sensor 16 is a light scattering type sensor having an LED 16*a* as a light emitting element and a photo-diode 16*b* as a light receiving element as shown in FIG. 3A and FIG. 3B. When the gas is irradiated with light from the LED 16*a*, this light is scattered by particles in the gas. The intensity of light scattered by particles in the gas is in proportion to the concentration of particles in the gas. In the dust sensor 16, the light scattered by particles in the gas is condensed using an optical lens (not shown) and received by the photo-diode 16*b*.

If the gas contains few particles as shown in FIG. 3A, the quantity of light scattered by light from the LED 16*a* is small and thus the level of light received by the photo-diode 16*b* is low; and if the gas contains many particles as shown in FIG. 3B, the quantity of light scattered by light from the LED 16*a* is large and the level of light received by the photo-diode 16*b* is high.

In the dust sensor 16, the LED 16*a* emits light to irradiate the gas and the light scattered by particles in the gas is condensed using an optical lens (not shown) and converted into an electric signal by the photo-diode 16*b*, then whether or not the quantity of dust in the gas is a predetermined value or more is determined by a comparison circuit using a comparator and the determined result is outputted. This type of dust sensor 16 which measures particles in the gas is a publicly known technique.

The audio playback part 17 has a deck slot 17*a* into which a medium such as a CD or DVD storing music data or video data is inserted, and reads and reproduces the data stored in the medium inserted in the deck slot. In addition, the audio playback part 17 has a detecting part (not shown) which detects insertion of a medium into the deck slot 17*a* (shown in FIG. 4B) and as the detecting part detects insertion of a medium into the deck slot 17*a*, it outputs a detection signal to the controller 15.

Upon receipt of a detection signal concerning insertion of a medium into the deck slot 17*a* from the audio playback part 17, the controller 15 outputs, to the audio playback part 17, a signal indicating a request for loading of a medium (LOAD), and upon receipt of a signal urging unloading of a medium from the control switch 21 according to the user's operation, it outputs, to the audio playback part 17, a signal indicating a request for ejection of a medium (EJECT).

Upon receipt of a signal indicating a request for loading of a medium (LOAD) from the controller 15, the audio playback part 17 carries out motion to insert a medium into the deck slot 17*a*, and upon receipt of a signal indicating a request for ejection of a medium (EJECT) from the controller 15, it carries out motion to unload a medium from the deck slot 17*a*.

The map deck 18 has a map ROM deck slot 18*a* (shown in FIG. 4D) into which a medium such as a CD or DVD storing map data is inserted, and reads the data stored in the medium inserted in the map ROM deck slot 18*a*. Like the audio playback part 17, the map deck 18 has a detecting part (not shown) which detects insertion of a medium into the map ROM deck slot 18*a* and as the detecting part detects insertion of a medium into the map ROM deck slot 18*a*, it outputs a detection signal to the controller 15.

Upon receipt of a detection signal concerning insertion of a medium into the map ROM deck slot 18*a* from the map deck 18, the controller 15 outputs, to the map deck 18, a signal indicating a request for loading of a medium (LOAD), and upon receipt of a signal urging unloading of a medium from the control switch 21 according to the user's operation, it outputs, to the map deck 18, a signal indicating a request for ejection of a medium (EJECT).

Upon receipt of a signal indicating a request for loading of a medium (LOAD) from the controller 15, the map deck 18 carries out motion to insert a medium into the map ROM deck slot 18*a*, and upon receipt of a signal indicating a request for ejection of a medium (EJECT) from the controller 15, it carries out motion to unload a medium from the map ROM deck slot 18*a*.

The tilt panel 19 has a display screen such as a liquid crystal one and shows on the display screen an image according to an input image signal from the controller 15.

The screen tilt mechanism 20 has a motor, a tilt bar 20*a* (shown in FIG. 4B) for moving the tilt panel 19, and a driving mechanism (not shown) for transmitting motor rotation to the tilt bar; and upon receipt of a signal indicating an open state of the tilt panel 19 from the controller 15, it moves the tilt panel 19 to bring it into an open state and, upon receipt of a signal indicating a closed state of the tilt panel 19 from the controller 15, moves the tilt panel 19 to bring it into a closed state.

FIG. 4A to FIG. 4D show how the tilt panel 19 moves. The tilt panel 19 slides step by step as shown in FIG. 4A to FIG. 4D.

Figure 4A:
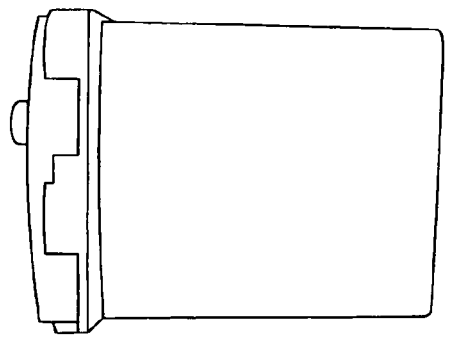
FIGS. 4A to 4D show illustrations of open/close operation of a tilt panel.
Figure 4B:
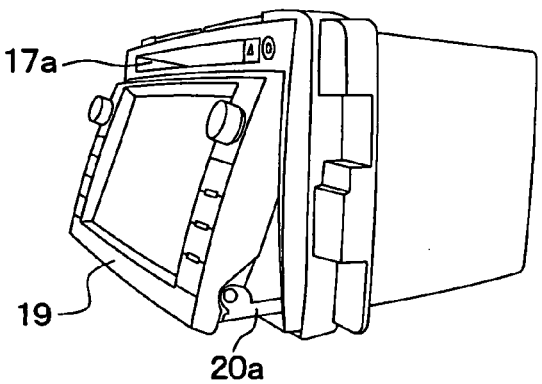
Figure 4C:
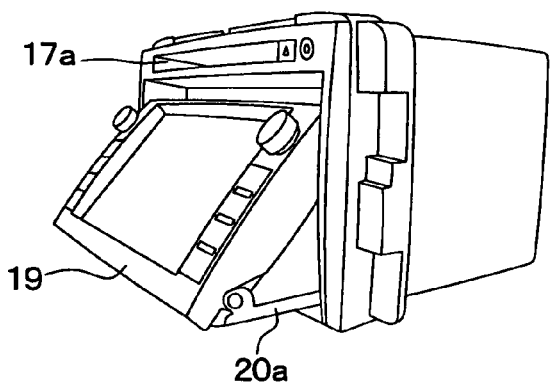

FIG. 4A shows that the tilt panel 19 is in a closed state; FIG. 4B shows a first step that the lower portion of the tilt panel 19 is pushed forward by the tilt bar 20*a* and the tilt panel 19 is about to open; FIG. 4C shows a second step that the lower portion of the tilt panel 19 is further pushed forward; and FIG. 4D shows a third step that the lower portion of the tilt panel 19 is pushed most forward and the tilt panel 19 is brought into an open state.

Figure 4D:
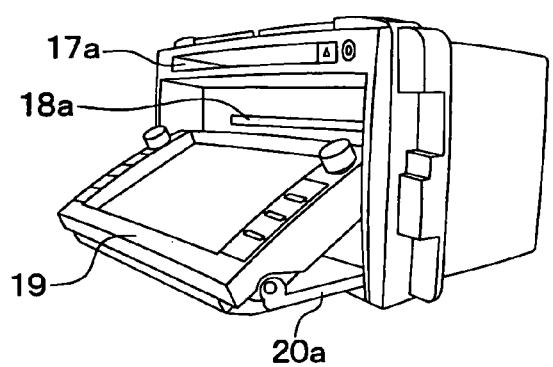

At the third step as shown in FIG. 4D, the tilt panel is ready for insertion of a medium into the map deck slot 18*a*.

The control switch 21, which is a pushbutton switch, a touch switch on the display screen of the screen tilt mechanism 20 or the like, outputs a signal according to the user's switch operation to the controller 15. The control switch 21 according to this embodiment includes an eject switch for unloading a medium from the deck slot 17*a* and an eject switch for unloading a medium from the map ROM deck slot 18*a* (not shown).

In the above structure, the controller 15 carries out: a vehicle position identifying process in which the vehicle's current position is identified according to a signal entered through the GPS interface 10 from the GPS antenna 10*a* and a vehicle speed pulse signal entered through the vehicle interface 13; a map display process in which map data on an area around the vehicle's current position is read from a medium inserted in the map deck 18 and a mark for the vehicle's current position is superimposed on a map showing an area around the vehicle's current position; and a radio receiving process in which a radio wave is received from a radio broadcast station selected by the user and outputted through a speaker (not shown).

In this embodiment, if it is found as a result of detection of the amount of dust in the gas by the dust sensor 16 that there is much dust in the vehicle compartment, the controller 15 carries out a process for reducing the amount of dust entering the unit.

Figure 5:
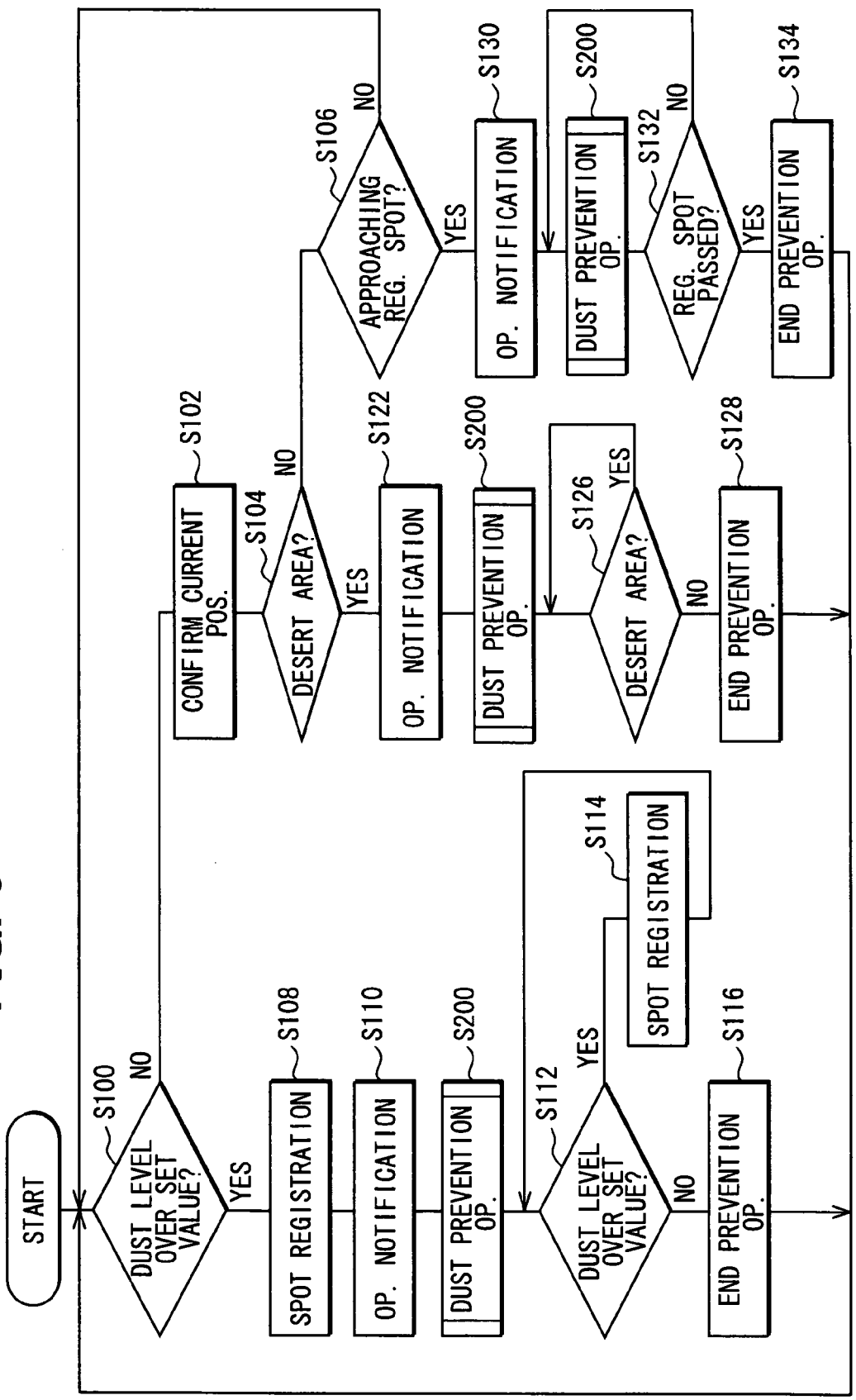
FIG. 5 shows a flowchart of a process in a controller.

Next, this process will be explained referring to FIG. 5. As an ignition switch is turned on and power is supplied from the power supply unit 14a, the controller 15 starts the process as shown in FIG. 5 concurrently with the above vehicle position identifying process and the map display process.

First, whether or not the amount of dust in the air in the vehicle compartment is a predetermined value or more is determined (Step S100). Specifically, whether or not a signal has been outputted to indicate that the amount of dust in the air in the vehicle compartment is a predetermined value or more is determined.

If the amount of dust in the air in the vehicle compartment is small, the determined result at Step S100 is "NO" and then the vehicle's current position is confirmed (Step S102). Specifically the vehicle's current position is confirmed based on the vehicle's current position identified by the vehicle position identifying process.

Next, whether or not the vehicle is currently located in a dusty area is determined (Step S104). In this embodiment, map data on an area around the vehicle's current position is read from the medium inserted in the map deck 18 and whether or not the vehicle is currently located in a desert area is determined.

If the vehicle is not located in a desert area, the determined result at Step S104 is "NO" and then whether or not there is a registered spot ahead of the vehicle is determined (Step S106). In this embodiment, a spot where the amount of dust in the air in the vehicle compartment is a predetermined value or more is stored in a memory at Step S108 which will be explained later, and based on this information stored in the memory and the current position as to whether or not, ahead of the vehicle in the traveling direction, whether the amount of dust in the air is a predetermined value or more at a registered spot is determined.

If a spot ahead of the vehicle where the amount of dust in the air is a predetermined value or more is not registered in the memory, the determined result at Step S106 is "NO" and the sequence goes back to Step S100.

If the amount of dust in the air in the vehicle compartment increases and the dust sensor 16 outputs a signal indicating that the amount of dust in the air in the vehicle compartment is a predetermined value or more, the determined result at Step S100 is "YES" and the spot concerned is registered (Step S108). Specifically information on the vehicle's current position (longitude and latitude data) as identified by the vehicle position identifying process is stored in the memory.

Next, the user is notified that dust intrusion prevention operation is going to begin (Step S110). Specifically, "Dust intrusion prevention operation will begin from now" or a similar message appears on the display screen of the tilt panel and at the same time the speaker (not shown) generates an audio message.

Figure 6:
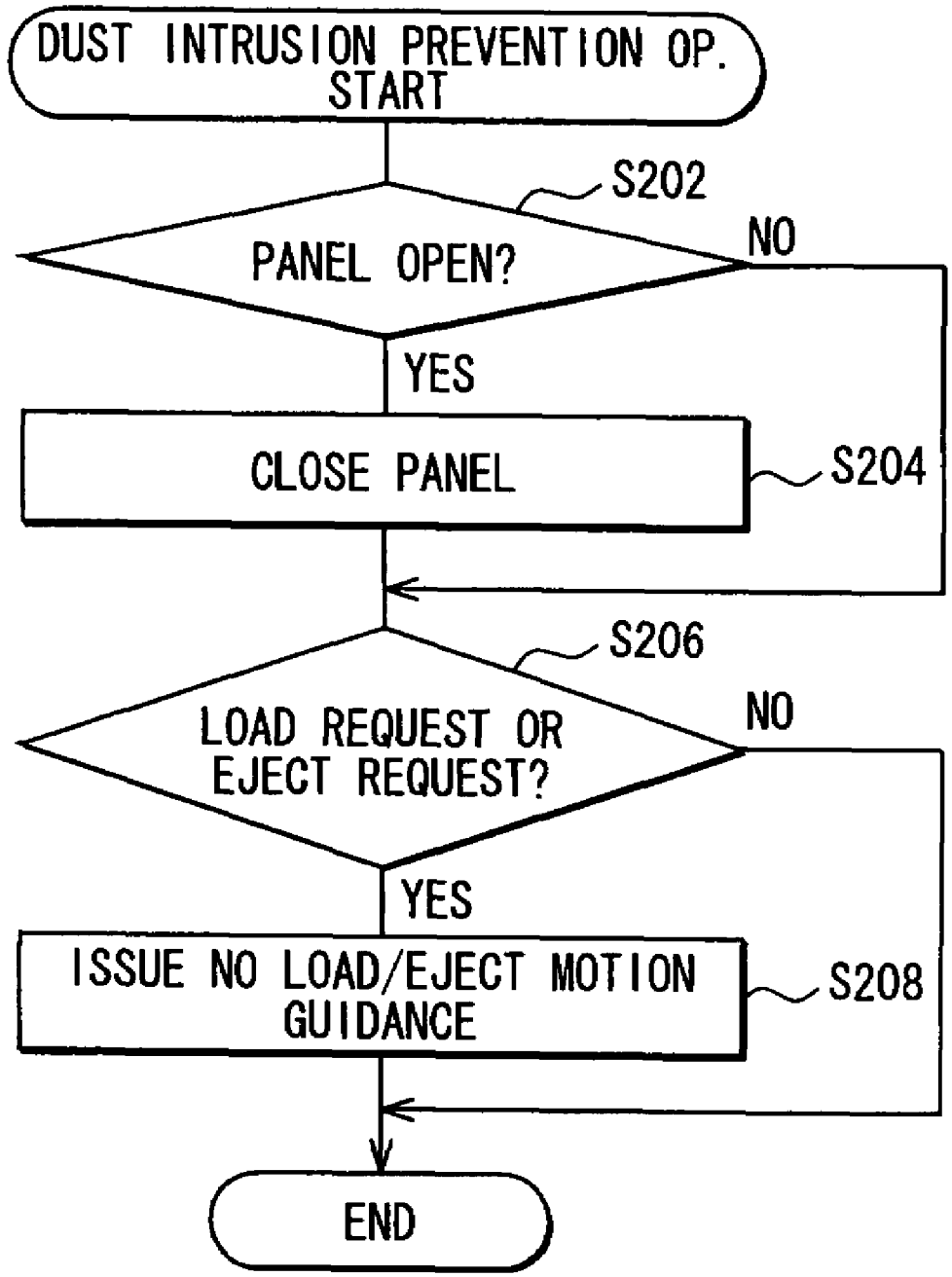
FIG. 6 shows a flowchart of a process of a dust intrusion prevention operation illustrations.
Figure 7:
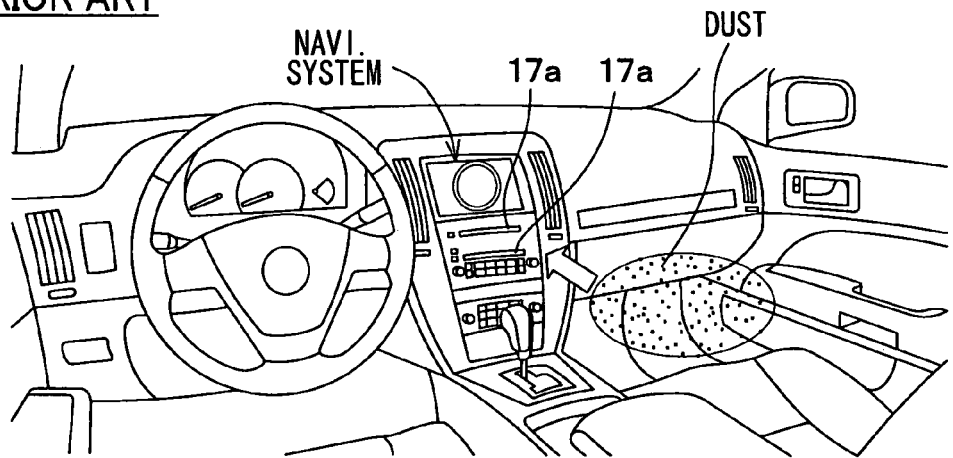
FIG. 7 shows an illustration of an environment of a conventional audio visual navigation system.
Figure 8:
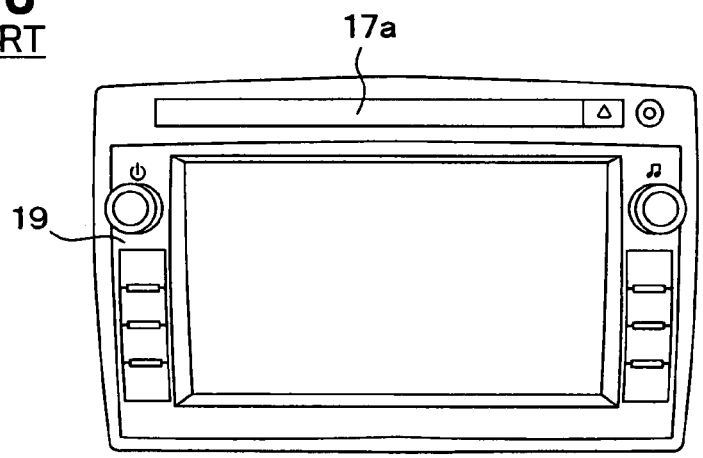
FIG. 8 shows a front view of the conventional audio visual navigation system.
Figure 9:
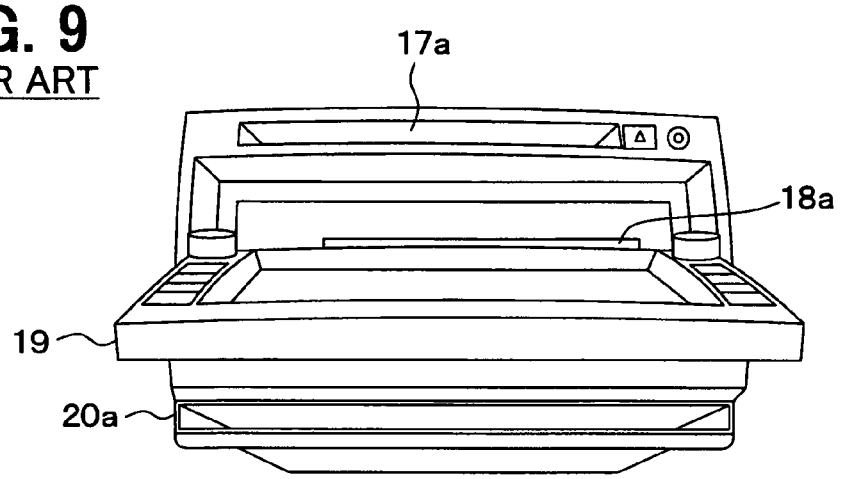
FIG. 9 shows another front view of the conventional audio visual navigation system.

Next, dust intrusion prevention operation takes place to prevent intrusion of dust into the unit (Step S200). FIG. 6 shows the process of dust intrusion prevention operation. In this process, first whether or not the tilt panel 19 is open is determined (Step S202). Specifically, whether or not the tilt panel 19 is open is determined according as whether a signal indicating that the tilt panel 19 is open or that the tilt panel 19 is closed has been outputted to the screen tilt mechanism 20.

If the tilt panel 19 is open, the determined result at Step S202 is "YES" and then the tilt panel closes (Step S204). Specifically, a signal indicating that the tilt panel 19 is closed is outputted to the screen tilt mechanism 20.

Upon receipt of this signal, the screen tilt mechanism 20 moves the tilt panel to bring it into a closed state.

Next, whether there is a request for loading of a medium (LOAD) or a request for ejection of a medium (EJECT) is determined (Step S206). Specifically, if either of signals (1) and (2) described below is entered, the system determines that there is a request for loading of the medium (LOAD); and if either of signals (3) and (4) described below is entered, the system determines that there is a request for ejection (EJECT).

(1) a detection signal from the audio playback part 17 which indicates that insertion of a medium into the deck slot 17a is detected.

(2) a detection signal from the map deck 18 which indicates that insertion of a medium into the map ROM deck slot 18a is detected.

(3) a signal corresponding to operation of the eject switch for unloading a medium from the deck slot 17a inputted as operation to a user control switch 21.

(4) a signal corresponding to operation of the eject switch for unloading a medium from the map ROM deck slot 18a inputted as operation to a user control switch 21.

Here, if any of the above signals (1) to (4) is entered, the determined result at Step S206 is "YES" and then a user guidance telling that LOAD or EJECT motion will not take place is issued (Step S208). Specifically, the system enters a mode which prohibits motions corresponding to the above signals (1) to (4) and a message "LOAD is prohibited" or "EJECT is prohibited" or the like appears on the display screen of the tilt panel and the speaker generates a similar voice message.

If any of the above signals (1) to (4) is not entered, the determined result at Step S206 is "NO" and this process is ended without issuing a user guidance at Step S208.

As mentioned above, at Step S200 for dust intrusion prevention operation, the system enters a prohibition mode in which the tilt panel 19, if open, closes and even if there is a medium LOAD request, insertion is prohibited or even if there is an EJECT request, unloading is prohibited.

Next, going back to FIG. 5, whether or not the amount of dust in the air in the vehicle compartment is a predetermined value or more is determined (Step S112).

If the amount of dust in the air in the vehicle compartment is a predetermined value or more, the determined result at Step S112 is "YES" and spot registration is made in the same way as above at Step S108 (Step S114) and the sequence goes back to Step S112 for determination.

In other words, spot registration at Step S114 is repeated until the amount of dust in the air in the vehicle compartment is less than a predetermined value and registered spots are plotted in the memory.

If the amount of dust in the air in the vehicle compartment is less than a predetermined value, the determined result at Step S112 is "NO" and then preventive operation is stopped (Step S116). Specifically, the mode which prohibits motions corresponding to the above signals (1) to (4) is cancelled. In other words, the system cancels the prohibition mode, which, even if there is a medium LOAD request or a medium EJECT request, prohibits a motion responding to the request and the sequence goes back to Step S100.

Therefore, if there is a medium LOAD request or a medium EJECT request, a motion responding to the request is performed.

Even if the system determines that the amount of dust in the air in the vehicle compartment is not a predetermined value or more ("NO" at Step S100), as the vehicle comes to a desert area, the determined result at Step S104 is "YES" and the user is notified that dust intrusion prevention operation is going to begin (Step S122). Specifically, "Dust intrusion prevention operation will begin from now" or a similar message appears on the display screen of the tilt panel and at the same time the speaker (not shown) generates an audio message and dust intrusion prevention operation at Step S200 is performed.

If the system determines that the vehicle is currently located in a desert area, dust intrusion prevention operation is also performed.

Therefore, the system enters the prohibition mode in which the tilt panel 19, if open, closes and even if there is a medium LOAD request, insertion is prohibited or even if there is an EJECT request, unloading is prohibited.

Next, again whether or not the vehicle is currently located in a desert area is determined (Step S126). If the vehicle is located in a desert area, the determined result at Step S126 is "YES" and the determined result at S126 is repeated.

As the vehicle leaves the desert area, the determined result at Step S126 becomes "NO" and preventive operation is stopped as at Step S116 and the sequence goes back to Step S100.

Consequently the system cancels the prohibition mode in which, even if there is a medium LOAD request or a medium EJECT request, prohibits a motion responding to the request.

Even if the system determines that the amount of dust in the air in the vehicle compartment is not a predetermined value or more ("NO" at Step S100) and the system also determines that the vehicle is not located in a desert area ("NO" at Step S104), when the system determines that within a given distance from the current position ahead of the vehicle in the traveling direction there is a registered spot where the amount of dust in the air in the vehicle compartment is a predetermined value or more, then the determined result at Step S106 is "YES" and the user is notified that dust intrusion prevention operation is going to start (Step S130). Specifically, "Dust intrusion prevention operation will begin from now" or a similar message appears on the display screen of the tilt panel and at the same time the speaker (not shown) generates an audio message and dust intrusion prevention operation at Step S200 is performed.

In this way, a dusty spot is automatically stored in the memory and if the system determines that there is a dusty spot ahead of the vehicle in the traveling direction, dust intrusion prevention operation at Step S200 is performed.

Here, the system enters the prohibition mode in which the tilt panel 19, if open, closes and even if there is a medium LOAD request, insertion is prohibited or even if there is a medium EJECT request, unloading is prohibited.

Next, whether or not the vehicle has passed a registered spot is determined (Step S132). Specifically, whether or not the vehicle has passed a registered spot is determined according to as whether or not the vehicle is on a road (link) including a registered spot plotted in the memory.

If it has not passed a registered spot, the determined result at Step S132 is "NO" and dust intrusion prevention operation at Step S200 is performed.

If it has passed a registered spot, the determined result at Step S132 is "YES" and preventive operation is stopped (Step S134) as at Step S116 and Step S128 and the sequence goes back to Step S100.

Consequently, the system cancels the mode which, even if there is a medium LOAD request or a medium EJECT request, prohibits a motion responding to the request.

As mentioned above, if the dust sensor 16 detects dust not less than a predetermined threshold, insertion of a storage medium into the opening or unloading of a storage medium from the opening is prohibited, thereby reducing dust intrusion into the unit.

If the dust sensor 16 detects dust not less than a predetermined threshold and the system determines that the tilt panel 19 is in a position forward from the opening into which a storage medium is inserted, the tilt panel 19 slides to stand in front of the opening into which a storage medium is inserted, thereby reducing dust intrusion into the unit.

If the system determines that the vehicle is located in a desert area, insertion of a storage medium into the opening or unloading of a storage medium from the opening is prohibited, which means, for example, that even if the dust sensor 16 does not detect dust not less than a predetermined threshold, insertion of a storage medium into the opening or unloading of a storage medium from the opening may be prohibited.

Also, if the system determines that the vehicle is located in a desert area, the tilt panel 19 slides to stand in front of the opening into which a storage medium is inserted, which means, for example, that even if the dust sensor 16 does not detect dust not less than a predetermined threshold, dust intrusion into the unit may be reduced.

When a spot where the dust sensor 16 detects dust not less than a predetermined threshold has been registered, if the system determines that the registered spot where the dust sensor 16 detects dust not less than a predetermined threshold exists ahead of the vehicle, insertion of a storage medium into the opening or unloading of a storage medium from the opening is prohibited, which means, for example, that even if the dust sensor 16 does not detect dust not less than a predetermined threshold, insertion of a storage medium into the opening or unloading of a storage medium from the opening may be prohibited.

When a spot where the dust sensor 16 detects dust not less than a predetermined threshold has been registered, if the system determines that the registered spot where the dust sensor 16 detects dust not less than a predetermined threshold exists ahead of the vehicle, the tilt panel 19 slides to stand in front of the opening into which a storage medium is inserted, which means, for example, that even if the dust sensor 16 does not detect dust not less than a predetermined threshold, the tilt panel 19 may slide to stand in front of the opening into which a storage medium is inserted.

Although the present invention has been fully described in connection with the preferred embodiment thereof with reference to the accompanying drawings, it is to be noted that various changes and modifications will become apparent to those skilled in the art.

For example, the dust intrusion prevention operation for the audio visual navigation system is exemplary described in the above embodiment, the prevention operation may be applied for apparatus that does not have the navigation function.

The dust sensor 16 may not only the light scattering type dust sensor but also other types of dust sensors. In addition, the dust sensor 16 may not only be disposed integrally at a front part of the on-board unit but also disposed as a different component, for example, at or around the front part of the unit.

Further, though, in the above embodiment, the dust intrusion prevention operation is performed when more than the predetermined amount of dust is detected by the sensor 16, when the vehicle is located in the dusty area without detecting more than the predetermined amount of dust, or when the vehicle is going to pass the registered spot without being in the dusty area and without detecting more than the predetermined amount of dust, the prevention operation may be performed when the predetermined amount of dust is detected, when the vehicle is in the dusty area, or when the vehicle is going to pass the registered spot.

Furthermore, though, in Step S132 in the above embodiment, passing of the registered spot by the vehicle is determined based on the vehicle's position on a road (link) where the registered spot is plotted, passing of the registered spot may be determined based on the vehicle's position in an area that includes plural registered spots successively plotted in the memory.

Furthermore, though, in Step S104 in the above embodiment, the dusty area is described as a desert area, the dusty area may be an unpaved road or the like. In this case, the map data may includes the pavement condition of the road, and the dusty area may be determined based on the pavement condition information.

Furthermore, the deck slot 17a may be a slot for, for example, MD medium, instead of the slot for CD, DVD medium.

Furthermore, the dust intrusion prevention operation is linked with the prohibition of the insertion/ejection of the medium through the slot and with the covering of the slot by the panel, the dust intrusion prevention operation may be linked with, for example, the prohibition of a cooling fan operation when a cooling fan is provided, or may be linked with shutting operation of windows when the window is open, or may be linked with the prohibition of opening operation of the window when the window is closed.

Such changes and modifications are to be understood as being within the scope of the present invention as defined by the appended claims.

What is claimed is:

1. An onboard apparatus for reading information stored on a memory medium that is inserted into the apparatus from an opening for medium insertion, the apparatus for use in a vehicle comprising:
   a position detector for acquiring a current position of the vehicle;
   a map reader for reading map data;
   an area locator for determining whether the vehicle is in a dusty area based on the current position of the vehicle derived from the position detector and the map data derived from the map reader; and
   a dust protector for protecting the apparatus from intrusion of dust through the opening in a preventive manner,
   wherein the dust protector performs a preventive operation for protecting the apparatus from intrusion of dust when the current position of the vehicle is located in the dusty area.

2. The onboard apparatus as in claim 1, wherein
   an audio playback part for performing an insertion operation of the memory medium upon receiving a request for media insertion through the opening and an ejection operation of the memory medium upon receiving a request for media ejection through the opening is provided in the apparatus,
   the dust protector includes a request determiner that determines whether the request for media insertion or the request for media ejection exists, and
   the dust protector includes a prohibition unit that prohibits the insertion operation of the memory medium through the opening or the ejection operation of the memory medium through the opening when the request determiner determines that the request for media insertion or the request for media ejection exists.

3. The onboard apparatus as in claim 1, wherein
   a tilt mechanism for tilting a panel away from a front of the opening and tilting the panel back to the front of the opening upon receiving user operation is provided in the apparatus,
   the dust protector includes a panel detector for detecting whether the panel is positioned in front of the opening, and
   the dust protector includes a panel controller for controlling the tilt mechanism to tilt the panel back to the front of the opening when the panel detector detects that the panel is positioned forward from the opening.

4. An onboard apparatus for reading information stored on a memory medium that is inserted into the apparatus from an opening for medium insertion, the apparatus for use in a vehicle comprising:
   a position detector for acquiring a current position of the vehicle;
   a dust sensor for detecting an amount of dust in an air in the vehicle; and
   a position recorder for recording a dusty position that identifies a position where the dust in an amount that is equal to or greater than a predetermined value is detected by the dust sensor;
   a position locator for determining whether the vehicle is going to pass the dusty position based on the current position derived from the position detector and information derived from the position recorder; and
   a dust protector for protecting the apparatus from intrusion of dust through the opening in a preventive manner,
   wherein the dust protector performs a preventive operation for protecting the apparatus from intrusion of dust when the position locator determines that the vehicle is going to pass the dusty position recorded by the position recorder.

5. The onboard apparatus as in claim 4, wherein
   an audio playback part for performing an insertion operation of the memory medium upon receiving a request for media insertion through the opening and an ejection operation of the memory medium upon receiving a request for media ejection through the opening is provided in the apparatus,
   the dust protector includes a request determiner that determines whether the request for media insertion or the request for media ejection exists, and
   the dust protector includes a prohibition unit that prohibits the insertion operation of the memory medium through the opening or the ejection operation of the memory medium through the opening when the request determiner determines that the request for media insertion or the request for media ejection exists.

6. The onboard apparatus as in claim 4, wherein
   a tilt mechanism for tilting a panel away from a front of the opening and tilting the panel back to the front of the opening upon receiving user operation is provided in the apparatus,
   the dust protector includes a panel detector for detecting whether the panel is positioned in front of the opening, and
   the dust protector includes a panel controller for controlling the tilt mechanism to tilt the panel back to the front of the opening when the panel detector detects that the panel is positioned forward from the opening.

* * * * *